(12) United States Patent
Obermark et al.

(10) Patent No.: US 12,214,753 B2
(45) Date of Patent: Feb. 4, 2025

(54) EXTENDABLE AND ANGULARLY ADJUSTABLE OBJECT SUPPORT RACK FOR A VEHICLE

(71) Applicant: Etrailer Corporation, Wentzville, MO (US)

(72) Inventors: Craig Obermark, Union, MO (US); Daniel Perotti, St. Peters, MO (US); Brenden McIntyre, Winfield, MO (US)

(73) Assignee: ETRAILER CORPORATION, Wentzville, MO (US)

( * ) Notice: Subject to any disclaimer, the term of this patent is extended or adjusted under 35 U.S.C. 154(b) by 134 days.

(21) Appl. No.: 17/950,554

(22) Filed: Sep. 22, 2022

(65) Prior Publication Data

US 2024/0051473 A1  Feb. 15, 2024

Related U.S. Application Data

(63) Continuation-in-part of application No. 17/883,763, filed on Aug. 9, 2022, now Pat. No. 11,919,485.

(51) Int. Cl.
*B60R 9/10* (2006.01)
(52) U.S. Cl.
CPC ..................... *B60R 9/10* (2013.01)
(58) Field of Classification Search
CPC ........................................................ B60R 9/10
USPC ........................................................ 224/324
See application file for complete search history.

(56) References Cited

U.S. PATENT DOCUMENTS

| | | | | |
|---|---|---|---|---|
| 4,991,865 A | * | 2/1991 | Francisco | B60D 1/155 280/479.2 |
| 5,096,102 A | * | 3/1992 | Tolson | B60R 9/08 224/523 |
| 5,476,203 A | * | 12/1995 | Fletcher | B60R 9/06 224/546 |
| 5,497,927 A | * | 3/1996 | Peterson | B60R 9/06 224/523 |
| 5,593,139 A | * | 1/1997 | Julian | B60R 9/06 224/521 |
| 5,647,521 A | * | 7/1997 | Burgess | B60R 9/10 224/532 |
| 5,695,103 A | * | 12/1997 | Duvernay | B60R 9/06 224/511 |
| 6,070,926 A | * | 6/2000 | Hardin | B60P 3/40 224/521 |
| 6,129,371 A | * | 10/2000 | Powell | B60R 9/06 280/491.5 |

(Continued)

*Primary Examiner* — Peter N Helvey
(74) *Attorney, Agent, or Firm* — Sandberg Phoenix & von Gontard, P.C.

(57) ABSTRACT

An extendable object support rack for a vehicle includes a rack rod that is removably attachable to the vehicle and has an object support on the rack rod that is removably attachable to an object to support the object on the rack rod, and an extension rod that is removably attachable to the rack rod without the use of tools and also has an object support on the extension rod that is removably attachable to an object to support the object on the extension rod. An opening in the forward end of the extension rod is configured for receiving a rearward end of the rack rod in the opening, and a pin in the opening is positioned to extend into a hole in the rearward end of the rack rod to secure the extension rod to the rack rod without the use of tools.

20 Claims, 11 Drawing Sheets

(56) References Cited

U.S. PATENT DOCUMENTS

| | | | | |
|---|---|---|---|---|
| 6,244,483 B1* | 6/2001 | McLemore | ............... | B60R 9/06 |
| | | | | 224/521 |
| 6,491,195 B1* | 12/2002 | McLemore | ............... | B60R 9/10 |
| | | | | 224/521 |
| 6,511,088 B2* | 1/2003 | Kahlstorf | ................. | B60D 1/52 |
| | | | | 280/415.1 |
| 6,913,277 B2* | 7/2005 | Mrofka | .................. | B60R 19/44 |
| | | | | 280/491.5 |
| 8,899,456 B2* | 12/2014 | Williams | ................. | B60R 9/10 |
| | | | | 224/501 |
| 9,802,549 B1* | 10/2017 | Shen | ........................ | B60R 9/10 |
| 10,183,627 B1* | 1/2019 | Liu | ........................... | B60R 9/06 |
| 11,479,182 B1* | 10/2022 | Yang | ......................... | B60R 9/10 |
| 2009/0078732 A1* | 3/2009 | Allsop | ..................... | B60R 9/10 |
| | | | | 224/520 |
| 2016/0068110 A1* | 3/2016 | Prescott | ................... | B60R 9/06 |
| | | | | 224/539 |
| 2017/0327053 A1* | 11/2017 | Anderson | ................ | B60R 9/06 |

* cited by examiner

EXTENDABLE AND ANGULARLY ADJUSTABLE OBJECT SUPPORT RACK FOR A VEHICLE

CROSS-REFERENCE TO RELATED APPLICATIONS

This patent application is a Continuation-In-Part application of patent application Ser. No. 17/883,763, filed on Aug. 9, 2022, and currently pending.

STATEMENT REGARDING FEDERALLY SPONSORED RESEARCH OR DEVELOPMENT

Not Applicable.

BACKGROUND

An object support rack, for example a bicycle support rack is often used to transport one or more bicycles on a vehicle. The typical bicycle support rack is removably attachable to a trailer hitch receiver tube at the back of the vehicle. Although the bicycle support rack makes transporting one or more bicycles on the vehicle convenient, there are some disadvantages associated with the construction of a typical bicycle support rack.

For example, when the bicycle support rack is attached to the trailer hitch receiver at the back of the vehicle, the support rack extends rearwardly from the vehicle. The extent to which the support rack extends from the vehicle usually depends on the number of bicycles the support rack is designed to support. When the support rack is not supporting bicycles, it is less noticeable. The support rack extending rearwardly from the vehicle could go unnoticed by a person walking by the back of the vehicle and the person could accidentally walk into the support rack and become injured.

The ability to attach the bicycle support rack to a trailer hitch receiver on a vehicle enables the bicycle support rack to be easily removed from the vehicle when not in use. However, the ability to easily remove the support rack when not in use creates the problem of storing the support rack when removed from the vehicle. A typical bicycle support rack is relatively large and cumbersome and takes up a good amount of storage space when removed from the vehicle and stored.

When in use, the bicycle support rack supports the bicycle or bicycles directly behind the rear of the vehicle. This position of the bicycles on the rack may obstruct access to the trunk, rear hatch or tailgate of the vehicle.

Furthermore, when a bicyclist first purchases a support rack for their vehicle, the bicyclist may have only one or perhaps two bicycles. The support rack purchased would only accommodate the one or two bicycles. Should the bicyclist later acquire an additional bicycle, it could require the bicyclist to discard the original support rack and purchase a new support rack that can support the additional bicycle.

BRIEF SUMMARY

The extendable and angularly adjustable object support rack or bicycle support rack of this disclosure has a unique construction that overcomes the above-described disadvantages. The construction enables the support rack to be moved or folded to a right angle configuration when the support rack is mounted on a vehicle but is not supporting bicycles. The right angle configuration of the support rack reduces the extent to which the support rack extends rearwardly from the vehicle and reduces the potential for a person walking by the back of the vehicle not noticing the support rack and accidentally walking into the support rack.

The construction of the support rack enables the support rack to be removed from the vehicle and moved to a folded over configuration when not in use. The folded over configuration of the support rack reduces the overall size of the support rack and makes storage of the support rack removed from the vehicle more convenient.

Additionally, the construction of the support rack enables a rearward portion of the support rack to be moved downwardly when supporting a bicycle or bicycles. The downward tilting movement of the rearward portion of the support rack moves the bicycles supported on the rearward portion away from the rear of the vehicle to which the support rack is attached. This provides sufficient clearance to access and open the trunk, rear hatch or tailgate of the vehicle without removing the support rack from the vehicle or removing bicycles from the support rack.

Furthermore, the support rack includes a support rack extension that is removably attachable to the support rack without the use of tools. The attachment of the extension to the support rack increases the capacity of bicycles that can be supported on the support rack. The extension attached to the support rack is movable through the angularly adjustable positions of the support rack.

The unique construction of the object support rack or bicycle support rack of this disclosure includes a first rod having a length between a forward end and an opposite rearward end of the first rod. The length of the first rod from the forward end to the rearward end defines a rearward direction relative to the support rack. The length of the first rod from the rearward end to the forward end defines a forward direction relative to the support rack. The forward end of the first rod is configured for attachment to a vehicle, and more specifically to a trailer hitch receiver on the vehicle. The attachment of the forward end of the first rod to the vehicle removably attaches the support rack to the vehicle.

An adjustment mechanism or structure is attached to the rearward end of the first rod. The structure extends upward from the rearward end of the first rod. The construction of the structure enables the angular adjustment of the support rack.

A groove is formed in the structure. The groove has an arcuate configuration and has a plurality of edge surfaces at spaced positions along the groove. The plurality of edge surfaces forms a plurality of stops on the structure. The stops are spatially arranged on the structure at a plurality of positions of the stops on the structure.

The construction of the support rack includes a second rod. The second rod has a length between a forward end of the second rod and an opposite rearward end of the second rod.

There is a connection on the forward end of the second rod. The connection attaches the forward end of the second rod to the adjustment mechanism or structure for movement of the second rod on the structure and relative to the first rod. The second rod is movable between the plurality of positions of the plurality of stops on the structure.

A detent constructed as a pin extends from a side of the second rod. The pin is configured for engaging each stop at each position of the plurality of positions of the plurality of stops on the structure and retaining the second rod at each position. A spring on the second rod biases the pin into engagement with each stop of the plurality of stops formed by the plurality of edge surfaces on the structure.

The plurality of stops includes a first stop that is engaged by the pin on the second rod and stops movement of the second rod on the structure and relative to the first rod. The first stop stops movement of the second rod at a folded over configuration of the first rod and second rod with the second rod positioned extending over the first rod. This folded over configuration of the second rod over the first rod reduces the area occupied by the support rack and makes it convenient to store the adjustable bicycle support rack when the support rack is removed from the vehicle.

The plurality of stops includes a second stop that is engaged by the pin and stops movement of the second rod on the structure and relative to the first rod. The second stop stops movement of the second rod with the second rod positioned extending in a right angle orientation relative to the first rod. This right angle orientation of the second rod on the first rod reduces the extent to which the adjustable bicycle support rack extends from the back of a vehicle when the support rack is attached to the vehicle and is not being used to support bicycles.

The plurality of stops includes a third stop that is engaged by the pin and stops movement of the second rod on the structure and relative to the first rod. The third stop stops movement of the second rod with the second rod positioned aligned with the first rod and extending in the rearward direction from the rearward end of the first rod. In this relative positioning of the first rod and second rod the adjustable bicycle support rack is used in attaching and supporting one or more bicycles on the support rack.

The plurality of stops includes a fourth stop that is engaged by the pin and stops movement of the second rod on the structure and relative to the first rod. The fourth stop stops movement of the second rod with the second rod positioned extending in the rearward direction from the rearward end of the first rod and extending downward from the rearward end of the first rod. The downward tilting movement of the second rod moves the bicycles supported on the second rod away from the rear of the vehicle to which the support rack is attached. This provides sufficient clearance to access and open the trunk, rear hatch or tailgate of the vehicle without removing the support rack from the vehicle or removing the bicycles from the support rack.

There is an actuator on the second rod that is operatively connected with the pin. Manual manipulation of the actuator moves the pin and disengages the pin from engagement with each engaged edge surface or stop on the structure.

There is at least one object support or bicycle support on the second rod, and preferably more than one bicycle support on the second rod. At least one of the bicycle supports is positioned on the second rod forward of the connection of the second rod to the adjustment mechanism or structure where the weight of a bicycle supported on the bicycle support counter acts the weight of a bicycle on a bicycle support positioned rearward of the connection. This distribution of the weight of the two bicycles on the opposite sides of the connection makes it easier to move the second rod relative to the first rod and lift the bicycle positioned rearward of the connection off the second rod of the support rack.

A support rack extension is removably attachable to the support rack, and more specifically to the second rod of the support rack. The extension is attachable to the support rack without the need for or the use of tools. The extension has a forward end with an opening in the forward end that is configured for receiving the rearward end of the second rod in the opening.

A pin in the opening in the forward end of the support rack extension is positioned to extend into a hole in the rearward end of the second rod. The engagement of the pin in the hole secures the extension in axial alignment with the second rod of the support rack without the use of tools.

A bolt with external screw threading is screw threaded through an internally screw threaded hole in the forward end of the support rack extension. The bolt extends from the exterior of the extension through the hole to the interior of the extension at the forward end of the extension. The bolt has a manual knob that can be turned to move the bolt into the interior of the extension and into engagement with the rearward end of the second rod to further secure the extension to the second rod and to the support rack.

A ramp surface is provided in the interior of the support rack extension adjacent the opening in the forward end of the extension. The ramp surface is positioned and configured to engage in sliding engagement with the rearward end of the second rod and guide the rearward end of the second rod toward the pin in the opening of the forward end of the extension until the pin is aligned with the hole in the rearward end of the second rod.

A flange extends outward from the exterior surface of the support rack second rod adjacent the rearward end of the second rod. The flange is positioned to engage against the forward end of the support rack extension and stop movement of the forward end of the extension over the rearward end of the second rod. This positions the pin on the forward end of the extension in alignment with the hole in the rearward end of the second rod and guides the pin into the hole in securing the extension to the second rod of the support rack.

Both the support rack extension and the second rod of the support rack have tubular, rectangular cross section configurations that prevent relative rotation between the extension and the second rod when the opening at the forward end of the extension is positioned over the rearward end of the second rod.

The features, functions, and advantages of the extendable and adjustable object support rack apparatus that have been discussed can be achieved independently in various embodiments or may be combined in yet other embodiments, further details of which can be seen with reference to the following description and drawings.

BRIEF DESCRIPTION OF THE DRAWINGS

Corresponding reference numerals will be used throughout the several figures of the drawings.

DETAILED DESCRIPTION

Figure 1:
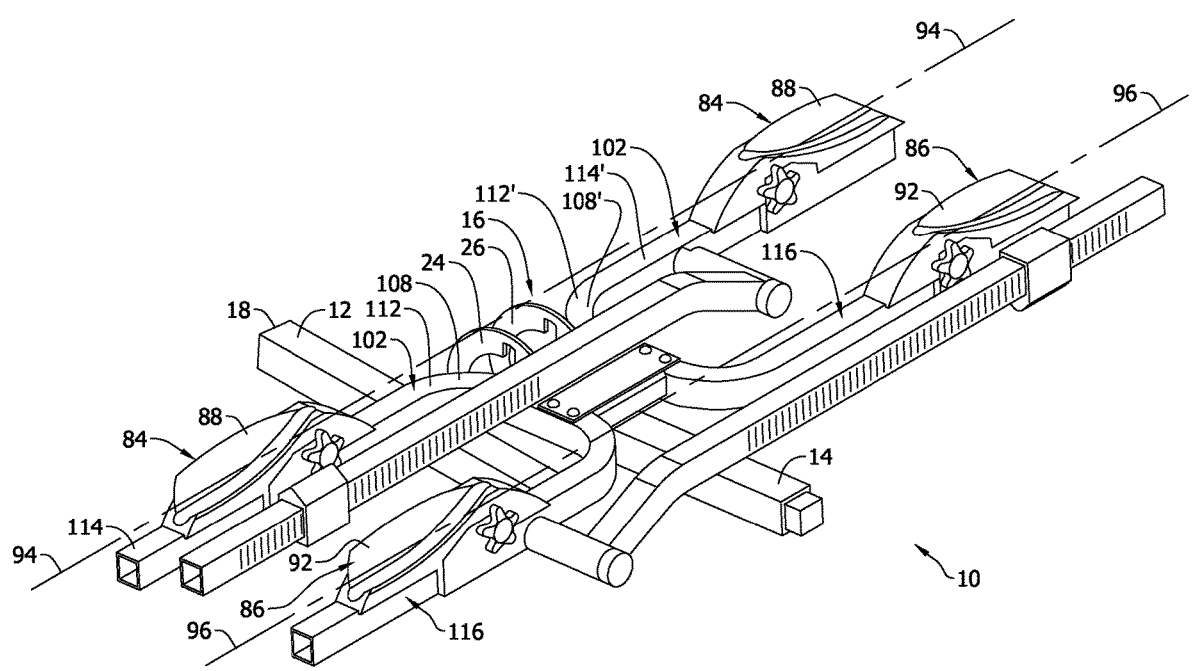
FIG. 1 is a representation of a top, perspective view of the angularly adjustable object support rack for a vehicle from a rearward end of the support rack.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
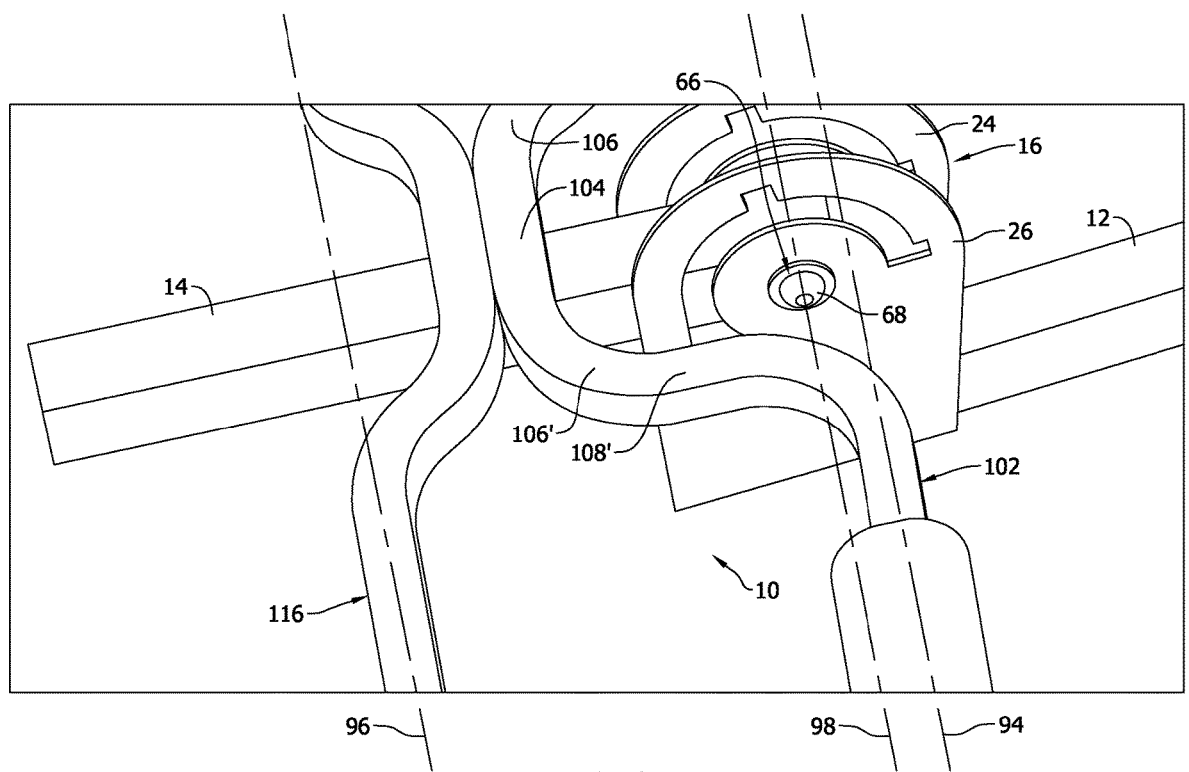
FIG. 2 is a representation of a top, perspective view of the support rack from the opposite side of the support rack represented in FIG. 1.

FIG. 1 is a representation of a top, perspective view of the extendable and angularly adjustable object support rack for a vehicle 10 of this disclosure. In the orientation of the support rack 10 represented in FIG. 1, a rearward end of the support rack 10 is shown to the right in FIG. 1 and a forward end of the support rack is shown to the left in FIG. 1. FIG. 2 is a representation of a partial, top perspective view of the support rack 10 from the opposite side of the support rack represented in FIG. 1. The support rack 10 is basically comprised of a first rod 12 at a forward end of the support rack, a second rod 14 at a rearward end of the support rack and an adjustment mechanism structure 16 connecting the first rod 12 to the second rod 14. The first rod 12, second rod 14 and adjustment mechanism structure 16, as well as the other component parts of the support rack 10 to be described, are constructed of materials that provide the component parts with sufficient strength for their intended functioning.

The first rod 12 has a straight length extending between the forward end 18 and the rearward end 22 of the first rod. The first rod 12 has a hollow, rectangular cross section configuration along the entire length of the first rod 12 between the forward end 18 and the rearward end 22. For a point of reference, the length of the first rod 12 from the rearward end 22 to the forward end 18 defines a forward direction relative to the support rack 10. The length of the first rod 12 from the forward end 18 to the rearward end 22 defines a rearward direction relative to the support rack 10. The forward end 18 of the first rod 12 is configured for removable attachment to a vehicle, and more specifically to a receiver tube of a conventional trailer hitch assembly that is attached to the rearward end of a vehicle.

Figure 3:
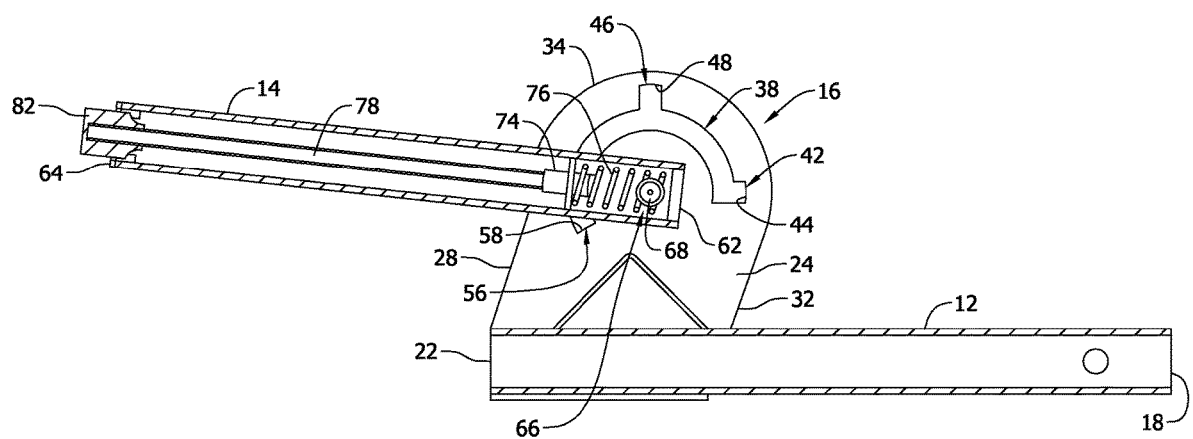
FIG. 3 is a representation of a cross section elevation view of the first rod, the second rod and the adjustment mechanism structure of the support rack from the opposite side of the support rack represented in the FIG. 1.
Figure 4:
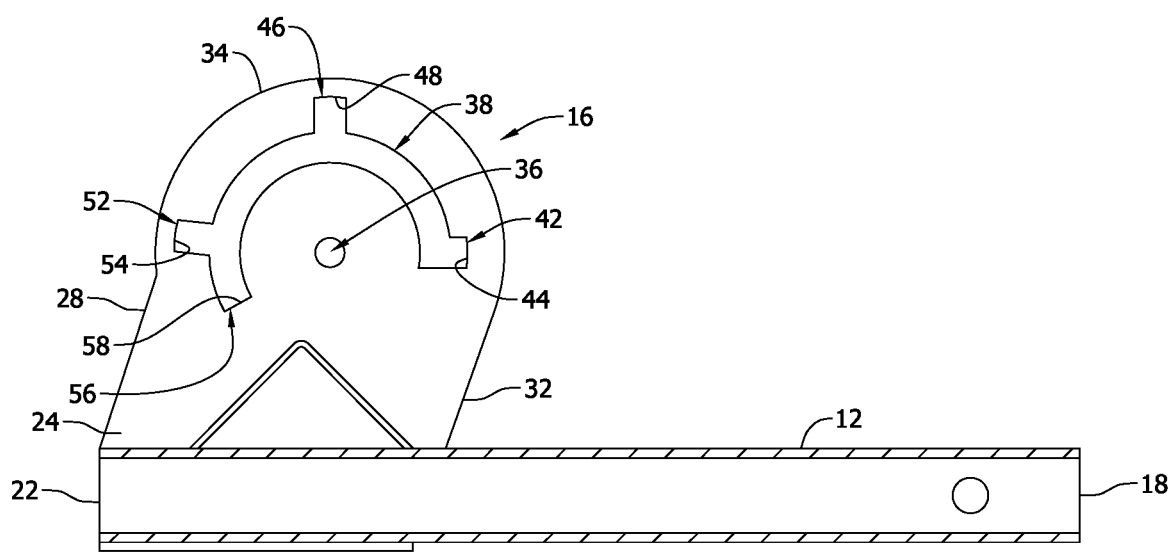
FIG. 4 is a representation of the cross section of the first rod and adjustment structure of FIG. 3 with the second rod removed.

The adjustment mechanism structure 16 is attached to the rearward end 22 of the first rod 12. The structure 16 extends upward from the rearward and 22 of the first rod 12 and is basically comprised of a pair of plates 24, 26 secured to the opposite sides of the first rod 12 at the rearward end 22 of the first rod. As represented in FIG. 1 and FIG. 2, the plates 24, 26 have substantially identical constructions. Therefore, only a first one of the plates 24 represented in the cross section view of the support rack 10 in FIG. 3 and FIG. 4 is described herein. The second plate 26 has the same construction as the first plate 24 described.

As represented in FIG. 3 and FIG. 4, the plate 24 has opposite forward 28 and rearward 32 edges that are straight, parallel and extend upward from the rearward end 22 of the first rod 12. The edges 28, 32 extend upward and meet at a curved top edge 34 at the top of the plate 24. A pivot hole 36 extends through the plate 24. A curved groove 38 also extends through the plate 24. The curved groove 38 has an arcuate configuration with a radius of curvature that is centered at the pivot hole 36.

A first notch 42 is formed in the right hand end of the groove 38 as represented in FIGS. 3 and 4. The first notch 42 extends from the groove 38 to a first end surface 44 of the first notch 42. The first end surface 44 defines a first stop 44 in the plate 24 of the adjustment structure 16. A second notch 46 is formed in the groove 38 at the top of the groove as represented in FIGS. 3 and 4. The second notch 46 extends from the groove 38 upward to a second end surface 48 of the second notch 46. The second end surface 48 defines a second stop 48 on the plate 24 of the adjustment structure 16. A third notch 52 is formed in the left side of the groove 38 generally opposite the first notch 42 as represented in FIG. 4. The third notch 52 extends from the groove 38 to a third end surface 54 of the third notch 52. The third end surface 54 defines a third stop 54 on the plate 24 of the adjustment structure 16. The groove 38 extends from the third notch 52 downward to an end of the groove that forms a fourth notch 56. As represented in FIG. 4, the fourth notch 56 is positioned downward from and below the third notch 52. The fourth notch 56 defines a fourth end surface 58 of the groove 38 and a fourth stop 58 on the plate 24 of the adjustment structure 16. As represented in FIGS. 3 and 4, the plurality of stops 44, 48, 54, 58 provided on the structure 16 are spatially arranged on the structure at a plurality of positions of the plurality of stops on the structure.

The second rod 14 has a straight length extending between a forward end 62 and an opposite rearward end 64 of the second rod. The second rod 14 also has a hollow, rectangular cross section configuration along the entire length of the second rod between the forward end 62 and the opposite rearward end 64 of the second rod. The forward end 62 of the second rod 14 is connected by a pivot connection 66 to the adjustment mechanism structure 16. The pivot connection 66 is basically provided by a pivot pin 68 that extends through the first plate 24 of the adjustment structure 16, then through the forward end 62 of the second rod 14 and then through the second plate 26 of the adjustment structure 16. The pivot connection 66 provided by the pivot pin 68 enables the second rod 14 to be moved in angular adjusting, pivoting movements about the pivot connection 66 and relative to the adjustment structure 16 and the first rod 12. The second rod 14 is movable between the plurality of positions of the plurality of stops 44, 48, 54, 58 on the adjustment structure 16.

Figure 5:
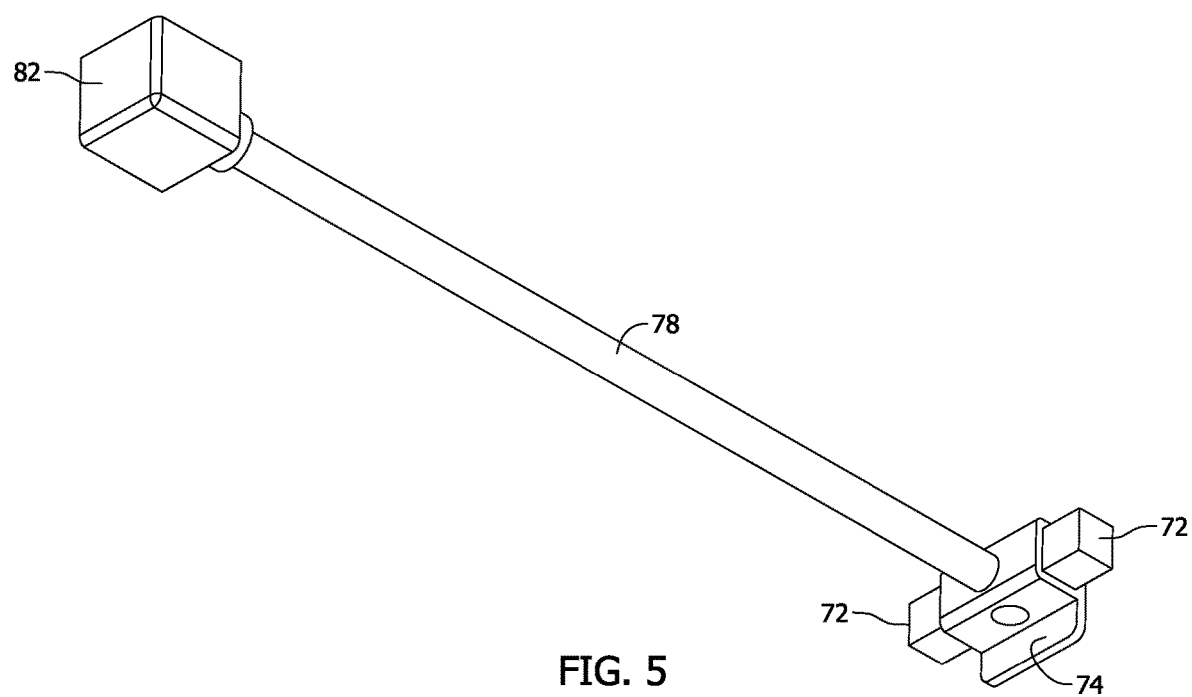
FIG. 5 is a representation of a perspective view of an actuator, shaft, and detent pins inside the second rod of FIG. 3.

A detent is positioned in the interior of the forward end 62 of the second rod 14 for limited reciprocating movements of the detent in the second rod. As represented in FIG. 5, the detent is constructed as one or two pins 72 extending from a side of a detent base 74. The detent base 74 is configured to slide in reciprocating movements through the interior of the second rod 14. The pin 72 extends from the base 74 and through an elongate opening in a side of the second rod and into the groove 38 in the first plate 24 of the adjustment structure 16. The pin 72 is configured for engaging each stop at each position of the plurality of positions of the plurality of stops 44, 48, 54, 58 on the adjustment structure 16 and retaining the second rod at each position. A spring 76 in the second rod 14 engages against the detent base 74 and biases the base 74 toward the rearward end 64 of the second rod 14. The spring 76 biases the pin 72 into engagement with each stop of the plurality of stops 44, 48, 54, 58 on the adjustment structure 16.

An elongate, straight shaft 78 is connected to the detent base 74 at a forward end of the shaft. The opposite, rearward end of the shaft 78 is connected to an actuator in the form of a manual button 82. The actuator button 82 emerges from the interior of the second rod 14 at the rearward end 64 of the second rod. The spring 76 biases the actuator button 82 to its position extending from the rearward end 64 of the second rod 14. Manually pressing the actuator button 82 into the rearward end 64 of the second rod 14 causes the detent pin 72 to move toward the forward end 62 of the second rod 14 and disengages the pin 72 from any of the stops 44, 48, 54, 58 of the groove 38 in which the detent pin 72 is engaged. The disengagement of the detent pin 72 from the stops 44, 48, 54, 58 enables the pin 72 to slide through the groove 38 and enables the second rod 14 to be manually, angularly moved in pivoting movements on the adjustment structure 16 and relative to the first rod 12.

To make angular adjustments of the object support rack 10, an operator first manually depresses the actuator button 82 into the rearward end 64 of the second rod 14. This disengages the detent pin 72 from any of the notches 42, 46, 52, 56 associated with the respective stops 44, 48, 54, 58 on the adjustment mechanism structure 16. This enables the second rod 14 to freely pivot about the pivot connection 66 provided by the pivot pin 68 to adjusted angular positions of the second rod 14 relative to the first rod 12.

Figure 6:
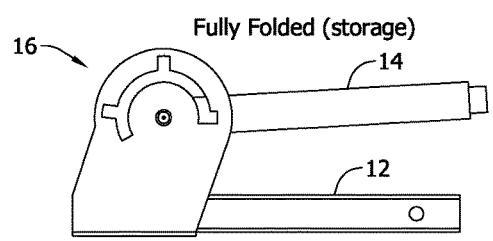
FIG. 6 is a representation of a side elevation view of the support rack in the folded over storage configuration of the support rack.

For example, the second rod 14 can be angularly adjusted relative to the first rod 12 to position the second rod 14 at the first stop 44. At the first stop 44 the detent pin 72 engages in the first notch 42 and stops movement of the second rod 14 on the adjustment structure 16 and relative to the first rod 12. The first stop 44 stops movement of the second rod 14 at a folded over configuration with the second rod 14 positioned extending in the forward direction from the pivot connection 66 on the forward end 62 of the second rod 14 over the first rod 12 to the rearward end 64 of the second rod 14 as represented in FIG. 6. It can be seen from the representation of the support rack 10 in FIG. 6 that the folded over configuration of the second rod 14 over the first rod 12 results in the support rack 10 occupying a reduced area and makes it convenient to store the support rack 10 when the support rack is removed from a vehicle.

Figure 7:
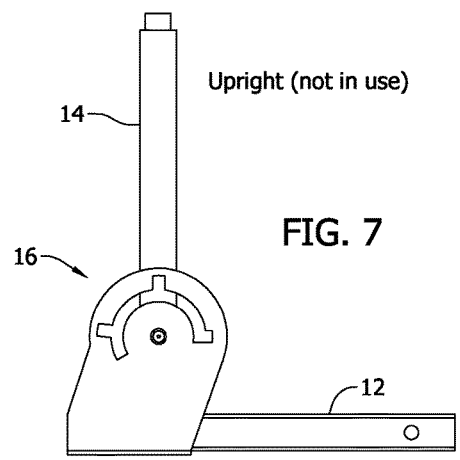
FIG. 7 is a representation of a side elevation view of the support rack in the right angle, not in use configuration of the support rack.

Manually depressing the actuator button 82 and disengaging the detent pin 72 from the first stop 44 enables adjusting movement of the second rod 14 on the adjustment mechanism structure 16 to the second stop 48. At the second stop 48 the actuator button 82 is released and the detent pin 72 engages in the second notch 46 and stops movement of the second rod 14 on the adjustment mechanism structure 16 and relative to the first rod 12. At the second stop 48 the second rod 14 is positioned extending in a right angle orientation relative to the first rod 12 represented in FIG. 7. The right angle orientation of the second rod 14 relative to the first rod 12 reduces the extent to which the support rack 10 extends from the back of a vehicle when the support rack is attached to the vehicle.

Figure 8:
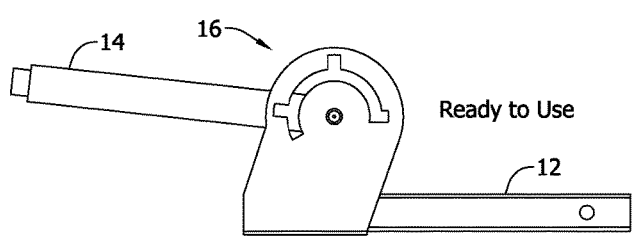
FIG. 8 is a representation of a side elevation view of the support rack in the transport configuration of the support rack.

Manually depressing the actuator button 82 disengages the detent pin 72 from the second notch 46 and enables adjusting movement of the second rod 14 relative to the first rod 12 to the position of the third notch 52. At the third notch 52 the button 82 is released and the detent pin 72 is biased by the spring 76 to engage against the third stop 54 and stop movement of the second rod 14 on the adjustment mechanism structure 16 and relative to the first rod 12. At the third stop 54 the second rod 14 is positioned aligned with the first rod 12 and extending in the rearward direction from the rearward end 22 of the first rod 12 as represented in FIG. 8. In this relative positioning of the first rod 12 and second rod 14 the adjustable bicycle support rack 10 is used in attaching and supporting one or more bicycles on the support rack.

Figure 9:
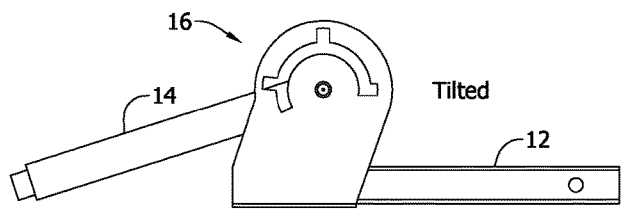
FIG. 9 is a representation of a side elevation view of the support rack in the downward tilted configuration of the support rack.

Manually depressing the actuator button 82 disengages the detent pin 74 from the third notch 52 and enables further adjusting movement of the second rod 14 relative to the first rod 12. The second rod 14 can be moved from the third stop 54 to the position of the fourth notch 56 and the fourth stop 58 on the adjustment mechanism structure 16. At the fourth stop 58 the button 82 is released and the spring 76 biases the detent pin 72 into the fourth notch 56 and into engagement with the fourth stop 58. This stops movement of the second rod 14 on the adjustment mechanism structure 16 and relative to the first rod 12. The fourth stop 58 stops movement of the second rod 14 with the second rod 14 positioned extending in the rearward direction from the rearward end 22 of the first rod 12 and extending downward from the rearward end of the first rod as represented in FIG. 9. This positions the second rod 14 tilted below the first rod 12 where it is easier to access a trunk, rear hatch or tailgate at the rear of a vehicle to which the support rack 10 is attached.

As represented in FIG. 1, there is at least one object support or bicycle support 84 on the second rod 14, and preferably more than one bicycle support on the second rod 14. Although the object supports are described as bicycle supports, the object supports could support a variety of objects such as camping equipment, boating equipment, sports equipment, etc. As represented in FIG. 1, there is a first bicycle support 84 on the second rod 14 and a second bicycle support 86 on the second rod. The first bicycle support 84 is basically comprised of a first pair of bicycle wheel cradles 88 that are configured for releasable attachment to the wheels of a bicycle to support the bicycle on the first bicycle support 84. The second bicycle support 86 has a second pair of bicycle wheel cradles 92 that are configured for releasable attachment to the wheels of a second bicycle to support the second bicycle on the second bicycle support 86. As represented in FIG. 1, the first pair of wheel cradles 88 are positioned along a first object axis or bicycle axis 94 and the second pair of wheel cradles 92 are positioned along a second object axis or bicycle axis 96. Referring to FIG. 2, it is shown that the first bicycle axis 94 is positioned forward of a pivot axis 98 of the pivot connection 66 provided by the pivot pin 68 and the second bicycle axis 96 is positioned rearward of the pivot axis 98 of the pivot connection 66 provided by the pivot pen 68. This positioning of the first bicycle axis 94 and the second bicycle axis 96 distributes the weight of two bicycles supported on the first bicycle support 84 and the second bicycle support 86 on opposite sides of the pivot pin 68 making it easier to move the second rod 14 supporting the two bicycles relative to the first rod 12. This makes it easier to raise and lower the second rod 14 relative to the first rod 12 when lowering the bicycles on the second rod 14 of the support rack 10 to gain access to the rear of the vehicle to which the support rack is attached.

The positioning of the first bicycle axis 96 forward of the pivot axis 98 is achieved by the unique configuration of the first bicycle support 84. As represented in FIG. 2, the first bicycle support 84 comprises a first bar 102 that is attached to the forward end 62 of the second rod 14 and traverses the second rod 14 in a perpendicular orientation. The first bar 102 has a hollow rectangular cross section configuration such as that of the first rod 12 and second rod 14. The first bar 102 has a center portion 104 that is secured to the second rod 14 buy fasteners or other equivalent means spaced rearward of the adjustment structure 16. On opposite ends of the center portion 104, the first bar 102 is formed with curved portions or bent portions 106, 106' that bend from the opposite ends of the center portion 104 and then extend in the forward direction on opposite sides of the adjustment structure 16. The bent portions 106, 106' of the first bar 102 extend forward to forward portions 108, 108' of the first bar 102. The forward portions 108, 108' extend forward from the bent portions 106, 106' on opposite sides of the adjustment structure 16 to further bent portions 112, 112' of the first bar 102. The further bent portions 112, 112' curve or bend outwardly from the forward portions 108, 108' to outward end portions 114, 114' of the first bar 102. The outward end portions 114, 114' of the first bar 102 support the first pair of wheel cradles 88. The outward end portions 114, 114' of the first bar 102 are also positioned along the first object axis or first bicycle axis 94. It can be seen that the unique configuration of the first bar 102 described above positions the first pair of wheel cradles 88 on opposite sides of the adjustment structure 16 and positions the first object axis or first bicycle axis 94 forward of the pivot axis 98 of the pivot connection 66 on the adjustment structure 16 as represented in FIG. 2.

As represented in FIGS. 1 and 2, the second bicycle support 86 is comprised of a second bar 116 having a configuration that is a mirror image of the first bar 102. Although only the first bar 102 and second bar 116 are represented in FIGS. 1 and 2, additional bicycle supports comprised of additional bars such as the first bar 102 and second bar 116 can be added to the second rod 14 to support additional bicycles on the support rack 10.

Figure 10:
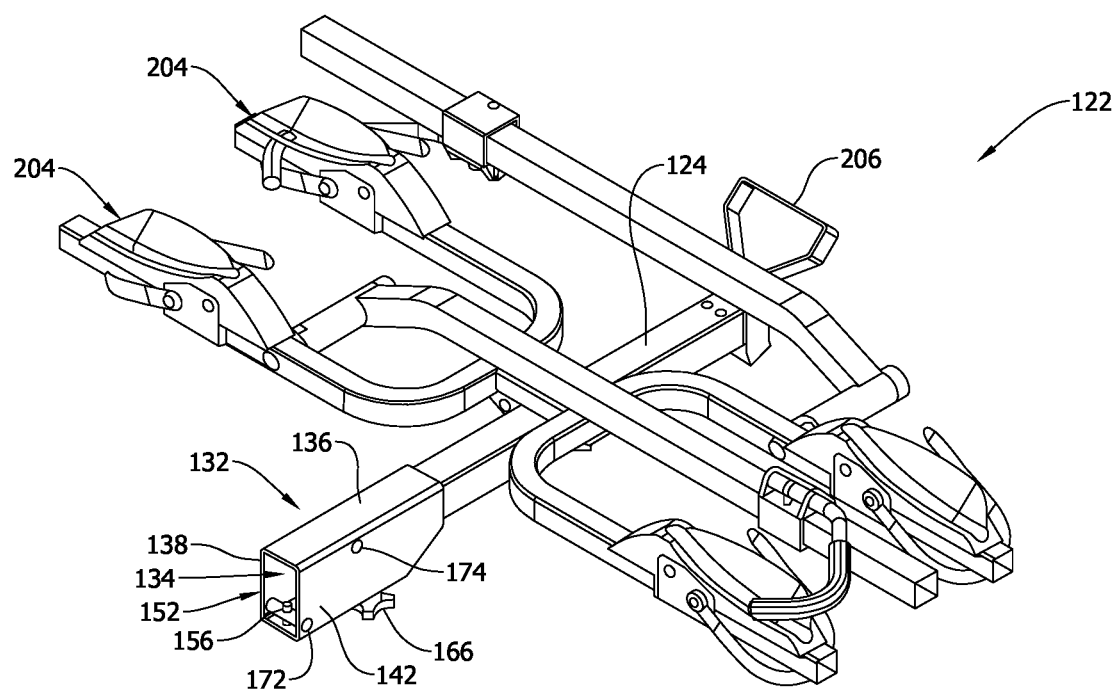
FIG. 10 is a representation of a top perspective view of a support rack extension that is removably attachable to the support rack of FIG. 1 without the need for or the use of tools.

FIG. 10 is a representation of a top, perspective view of a support rack extension 122 that is removably attachable to the support rack 10 to add additional object supports to the support rack. More specifically, the support rack extension 122 is removably attachable to the rearward rod or second rod 14 of the support rack 10 without the need for or the use of tools. As in the construction of the support rack 10, the support rack extension 122 is constructed of materials that provide the extension with sufficient strength for its intended functioning.

Figure 11:
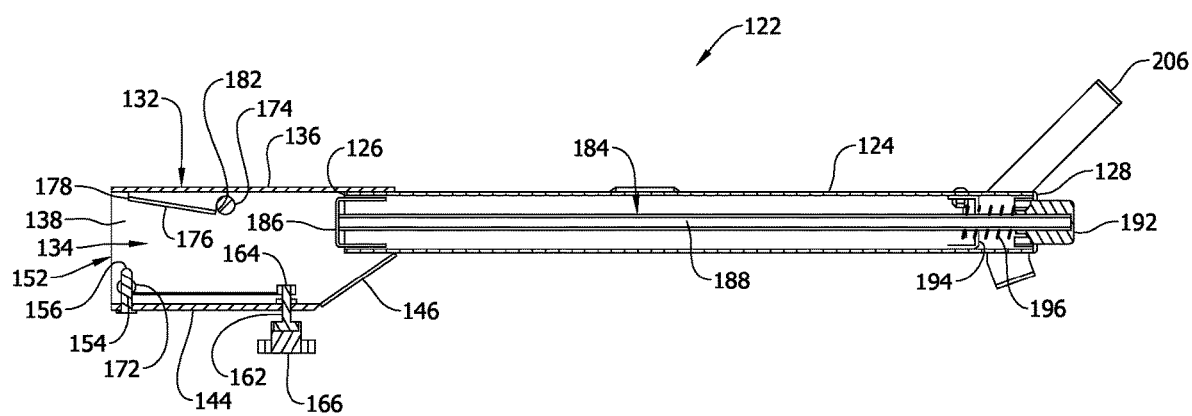
FIG. 11 is a representation of a cross section elevation view of the support rack extension of FIG. 10 with bicycle supports removed to simplify the representation.

In the orientation of the support rack extension 122 represented in FIG. 10, a forward end of the extension 122 is shown to the left in FIG. 10 and a rearward end of the extension 122 is shown to the right in FIG. 10. As represented in FIG. 10 and FIG. 11, the extension 122 is basically comprised of an extension rod 124 or a third rod 124. The third rod 124 has a rectangular cross section configuration with a hollow interior that extends between a forward end 126 of the third rod 122 and an opposite rearward end 128 of the third rod. The cross section configuration of the third rod 124 is substantially the same as that of the first rod 12 and the second rod 14 of the support rack 10. The length of the third rod 124 between the forward end 126 and the rearward end 128 defines a rearward direction relative to the third rod 124 and relative to the support rack extension 122. The length of the third rod 124 from the rearward end 128 to the forward end 126 defines a forward direction relative to the third rod 124 and relative to the support rack extension 122.

The support rack extension 122 also comprises an attachment structure 132 secured to the forward end 126 of the third rod 124. The attachment structure 132 has a rectangular cross section configuration and a hollow interior 134. The rectangular cross section configuration of the attachment structure 132 is larger than the cross section configuration of the third rod 124. The attachment structure 132 has a top panel 136 defining a top surface of the attachment structure. The top panel 136 is secured to and forms an extension of the top of the third rod 124. The attachment structure 132 includes a left side panel 138 and an opposite right side panel 142. As represented in FIG. 10, the left side panel 138 and the right side panel 142 are secured to and are extensions of the respective left side and right side of the third rod 124. The distance or spacing between the left side panel 138 and the right side panel 142 on opposite sides of the interior 134 of the attachment structure 132 is only slightly larger than the distance between the opposite sides of the third rod 124. With the first rod 12, second rod 14 and third rod 124 having the same cross section configurations, the distance between the left side panel 138 and the right side panel 142 is only slightly larger than the distance between the opposite left and right sides of the second rod 14 of the support rack 10. This enables the rearward end 64 of the second rod 14 to be inserted into the attachment structure 132 between the left side panel 138 and the right side panel 142, with the left side panel 138 and right side panel 142 of the attachment structure 132 and the support rack extension 122 preventing relative rotation between the attachment structure 132 of the support rack extension 122 and the second rod 14 of the support rack 10. The attachment structure 132 also includes a bottom panel 144 that is secured the left side panel 138 and the right side panel 142 on the opposite side of the attachment structure interior 134 from the top panel 136. The spacing between the top panel 136 and the bottom panel 144 is larger than the spacing between the top and bottom of the second rod 14 of the support rack 10. This enables the attachment structure 132 to be moved in pivoting or angular movements upwardly and downwardly relative to the rearward end 64 of the second rod 14 when the rearward end 64 of the second rod 14 is inserted into the interior 134 of the attachment structure 132. The attachment structure 132 has an angled panel 146 that extends from the bottom panel 144 to the third rod 124 and further secures the attachment structure 132 to the third rod 124. The construction of the attachment structure 132 defines a forward opening 152 of the attachment structure and a forward opening 152 of the support rack extension 122. The forward opening 152 is surrounded by the top panel 136, the left side panel 138, the right side panel 142 and the bottom panel 144. The construction of the attachment structure 132 configures the forward opening 152 for receiving the rearward end 64 of the second rod 14 of the support rack 10 through the forward opening 152 and into the interior 134 of the attachment structure 132.

A pin 154 extends through the bottom panel 144 of the attachment structure 132 to a distal end 156 of the pin positioned in the interior 134 of the attachment structure. The pin 154 has a cylindrical configuration and is positioned on the bottom panel 144 adjacent the forward opening 152 of the attachment structure 132.

A bolt 162 with external screw threading extends through an internally screw threaded hole in the bottom panel 144 of the attachment structure 132. The bolt 162 extends from the exterior of the support rack extension 122 to a distal end 164 of the bolt positioned in the interior 134 of the attachment structure 132. As represented in FIG. 11, the bolt 162 is positioned adjacent the angled panel 146 of the attachment structure 132. This positions the bolt 162 adjacent the forward end 126 of the third rod 124. The bolt 164 extends from the exterior of the support rack extension 122 through the internally screw threaded hole in the bottom panel 144 of the attachment structure 132 to the distal end 164 of the bolt 162 in the interior 134 of the attachment structure 132. The bolt 162 has a manual knob 166 on a proximal end of the bolt 162 outside the attachment structure 132. Manually turning the knob 166 clockwise moves the distal end 164 of the bolt 162 into the interior 134 of the attachment structure and away from the bottom panel 144. Manually turning the knob 166 counter-clockwise moves the distal end 164 of the bolt 162 toward the bottom panel 144 of the attachment structure 132.

A bottom crossbar 172 is secured to the attachment structure 132 extending between the left side panel 138 and the right side panel 142. The bottom crossbar 172 is positioned adjacent the forward opening 152 and above the bottom panel 144. The bottom crossbar 172 extends across and is secured to the pin 154 and reinforces the pin in the attachment structure 132.

A top crossbar 174 is secured to the attachment structure 132 extending between the left side panel 138 and the right side panel 142. The top crossbar 174 is positioned spaced rearward from the front opening 152 of the attachment structure 132 and toward the forward end 126 of the third rod 124.

A ramp panel 176 is secured in the interior 134 of the attachment structure 132. The ramp panel 176 is secured to the opposite left side panel 138 and right side panel 142 and to the top panel 136 as represented in FIG. 11. The ramp panel 176 has a forward edge 178 secured to the top panel 136 and an opposite rearward edge 182 secured to the top crossbar 174. This positions the ramp panel 176 as a sliding surface that is angled downwardly from the forward edge 178 of the ramp panel 176 to the rearward edge 182 of the ramp panel 176 as the ramp panel 176 extends into the interior 134 of the attachment structure 132. The ramp panel 176 is positioned and configured to engage in sliding engagement with the rearward end 64 of the second rod 14 of the support rack 10 and guide the rearward end 64 of the second rod into the interior 134 of the attachment structure 132 and over the pin 154.

An actuator extension 184 is positioned inside the third rod 124 of the support rack extension 122. The actuator extension 184 is comprised of an extension head 186 positioned in the third rod 124 extending from the forward end 126 of the third rod. The extension head 186 is mounted in the third rod 124 for reciprocating movements in the forward end 126 of the third rod. A forward end of an extension shaft 188 is connected to the extension head 186. The extension shaft 188 extends from the extension head 186 through the third rod 124 to an extension button 192 connected to the rearward end of the extension shaft 188. The extension button 192 is mounted in the rearward end 128 of the third rod 124 for reciprocating movements of the extension button 192 in the rearward end 128 of the third rod. An actuator extension base 194 is secured in the third rod 124. The actuator extension base 194 has a guide hole therethrough that receives the extension shaft 188 and supports the extension shaft 188 for sliding reciprocating movements of the extension shaft through the third rod 124. A spring 196 is positioned between the actuator extension base 194 and the extension button 192. The spring 196 biases the extension button 192 and the extension shaft 186 in the rearward direction through the third rod 124. Manually depressing the extension button 192 in the forward direction relative to the support rack extension 122 causes the extension head 186 to extend in the forward direction from the forward end 126 of the third rod 124. When the support rack extension 122 is attached to the second rod 14 of the support rack 10, the extension head 186 of the support rack extension 122 is positioned against the actuator button 82 of the support rack 10. The movement of the extension head 186 in the forward direction causes the extension head 186 to engage against and press the actuator button 82 into the rearward end 64 of the second rod 14. This causes the detent pin 72 of the support rack 10 to move forward and disengage from any of the stops 44, 48, 54, 58 of the groove 38 in the adjustment structure 16. This enables the second rod 14 to be moved in pivoting movements on the adjustment structure 16 and relative to the first rod 12. Releasing the extension button 192 enables the spring 196 to move the extension button 192 and the extension head 186 in the rearward direction relative to the support rack extension 122. This rearward movement of the extension head 186 releases the extension head 186 from its engagement against the actuator button 84 on the second rod 14 of the support rack 10 and enables the spring 76 to bias the detent 72 in the rearward direction whereby the detent 72 can again engage with any of the stops 44, 48, 54, 58 of the groove 38.

As represented in FIG. 10, there is at least one object support or bicycle support 202 on the third rod 124 of the support rack extension 122, and preferably more than one bicycle support on the third rod 124. As with the support rack 10, although the object supports are described as bicycle supports, the object supports could support a variety of objects. As represented in FIG. 10, there is a third bicycle support 202 on the third rod 124 and a fourth bicycle support 204 on the third rod. The third bicycle support 202 and the fourth bicycle support 204 have the same constructions as the first bicycle support 84 and the second bicycle support 86 described earlier.

There is also a manual handle 206 secured to the rearward end 128 of the third rod 124. As represented in FIG. 10 and FIG. 11, the manual handle 206 extends outward from the rearward end 128 of the third rod 124 and is oriented at an angle relative to the length of the third rod. The manual handle 206 provides a grip for manually holding the support rack extension 122 when attaching the support rack extension to the support rack 10. The projection of the manual handle 206 from the rearward end 128 of the third rod 124 also provides some protection to the extension button 192 at the rearward end 128 of the third rod 124.

Figure 12:
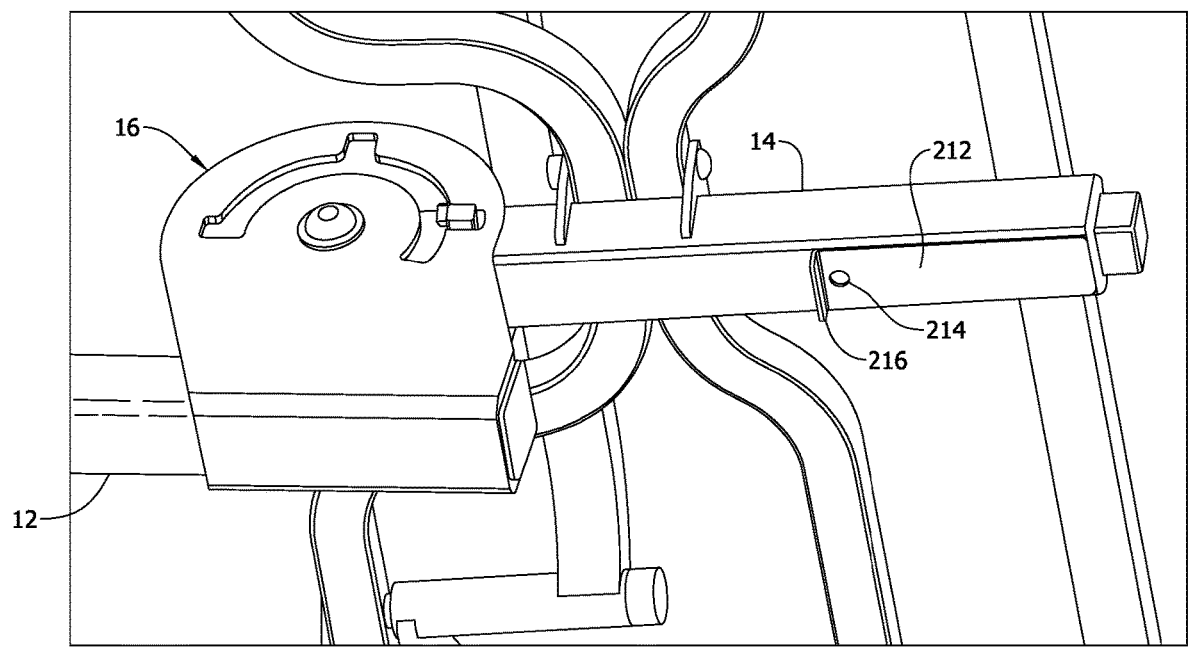
FIG. 12 is a representation of a partial, bottom perspective view of the support rack of FIG. 1.

FIG. 12 is a representation of the bottom surface 212 of the second rod 14 of the support rack 10. As represented in FIG. 12, a hole 214 extends through the bottom surface 212 of the second rod 14. The hole 214 is spaced forward on the bottom surface 212 a short distance from the rearward end 64 of the second rod 14. An abutment in the form of a flange 216 projects outward from the bottom surface 212 of the second rod 14 adjacent the hole 214. The flange 216 is spaced a short distance forward of the hole 214. The flange 216 is positioned to engage against the forward end of the support rack extension 122 defined by the forward end of the attachment structure 132. The engagement of the flange 216 with the forward end of the attachment structure 132 stops movement of the forward end of the support rack extension 122 over the rearward end 64 of the second rod 14 when attaching the support rack extension 122 to the support rack 10. The engagement of the flange 216 with the forward end of the attachment structure 132 also positions the pin 154 on the attachment structure 132 in alignment with the hole 214 through the bottom surface 212 of the second rod 14.

Figures 13, 14:
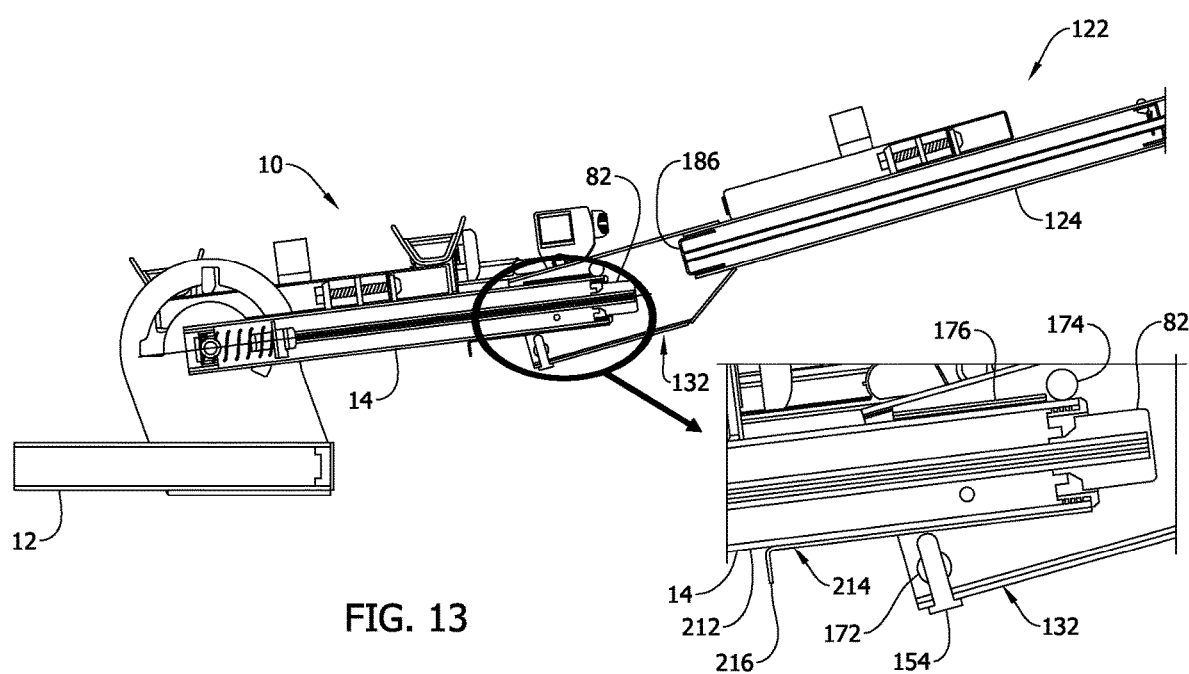
FIG. 13 is a representation of a cross section elevation view of the support rack extension being attached to the second rod of the support rack.
FIG. 14 is an enlarged, partial view of the cross section of FIG. 13.
Figure 15:
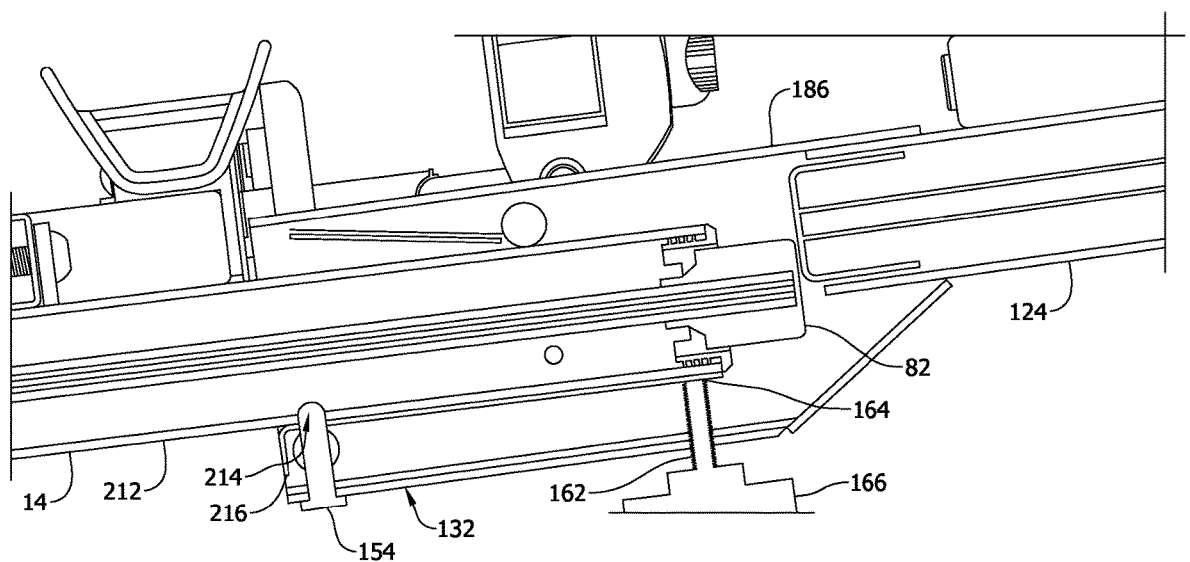
FIG. 15 is an enlarged, partial view similar to FIG. 14 showing the extension rod attached to the second rod.

FIGS. 13-15 represent the process of manually attaching the support rack extension 122 to the support rack 10 without the use of tools. In the description of the process, the second rod 14 of the support rack 10 is referred to as the rack rod 14 and the third rod 124 and attachment structure 132 of the support rack extension 122 are referred to as the extension rod 122. The support rack extension or extension rod 122 is first manually gripped at the handle 206 and or along the length of the extension rod 122 and the opening 152 in the forward end of the extension rod 122 is positioned adjacent the rearward end 64 of the rack rod 14. The rearward end 64 of the rack rod 14 is then inserted through the opening 152 of the extension rod 122. The rearward end 64 of the rack rod 14 is engaged against the ramp panel 176 in the opening 152 and slid across the surface of the ramp panel as the rearward end 64 is inserted through the opening 152. The engagement of the rearward end 64 of the rack rod 14 against the ramp panel 176 as the rearward end 64 is inserted through the opening 152 ensures that the actuator button 82 and the rearward end 64 of the rack rod 14 pass over the distal end 156 of the pin 154 in the opening 152 in the forward end of the extension rod 122 as represented in FIG. 13 and FIG. 14. The opening 152 in the forward end of the extension rod 122 is continued to be moved over the rearward end 64 of the rack rod 14 until the forward end of the extension rod comes into engagement with the abutment or flange 216 on the bottom surface 212 of the rack rod 14. The flange 216 is dimensioned with a width dimension that enables the flange 216 to engage against the opposite left side panel 138 and right side panel 142 of the attachment structure 132, or the forward end of the extension rod 122, as the attachment structure is moved over the rearward end 64 of the rack rod 14. If the flange 216 should not engage against the attachment structure 132 to stop movement of the attachment structure over the rearward end 64 of the rack rod 14, the flange 216 will engage against the pin 154 to stop movement of the attachment structure 132 over the rearward end 64 of the rack rod 14. When movement of the attachment structure 132 over the rearward end 64 of the rack rod 14 is stopped by engagement with the flange 216, the extension rod 122 is then moved in a downward pivoting movement relative to the rack rod 14 until the pin 154 is inserted into the hole 214 in the bottom surface 212 of the rack rod 14. The engagement of the pin 154 in the hole 214 in the bottom surface 212 of the rack rod 14 as represented in FIG. 15 secures the support rack extension 122 to the support rack 10 without the use of tools. To further secure the support rack extension 122 to the support rack 10, the bolt knob 166 on the proximal end of the bolt 162 is manually turned in a clockwise direction to cause the bolt distal end 164 to move upwardly in the interior 134 of the attachment structure 132. The bolt knob 166 is continued to be turned until the distal end 164 of the bolt 162 comes into engagement with the bottom surface 212 of the rack rod 14 as represented in FIG. 15. The engagement of the bolt distal end 164 against the bottom surface 212 of the rack rod 14 further secures the extension rod 122 to the rack rod 14 and secures the support rack extension 122 to the support rack 10 without the use of tools.

As represented in FIG. 15, when the support rack extension 122 is attached to the support rack 10, the actuator extension 184 of the support rack extension 122 is aligned with the actuator button 82 of the support rack 10. Manually depressing the extension button 192 of the support rack extension 122 results in the extension head 186 depressing the actuator button 82 of the support rack 10. This enables the second rod 14 of the support rack 10 to be adjustably positioned relative to the first rod 12 as described earlier when the support rack extension 122 is attached to the support rack 10.

To remove the support rack extension 122 from the support rack 10 the steps performed to secure the support rack extension 122 to the support rack 10 are performed in reverse order. In this manner, the support extension 122 is removed from the support rack 10 without the use of tools.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

The invention claimed is:

1. An extendable object support rack for a vehicle comprising:
    a support rack having a forward end that is configured for attachment to a vehicle and a rearward end that is opposite the forward end, the support rack having a length from the rearward end of the support rack to the forward end of the support rack that defines a forward direction relative to the support rack and the length of the support rack from the forward end of the support rack to the rearward end of the support rack defines a rearward direction relative to the support rack;
    a rack rod at the rearward end of the support rack, the rack rod extending in the rearward direction from the support rack;
    a hole in the rack rod;
    an extension rod that is separate from the rack rod, the extension rod having a forward end that is configured for receiving the rack rod in the forward end of the extension rod and a rearward end of the extension rod that is opposite the forward end of the extension rod; and
    a pin on the forward end of the extension rod, the pin is positioned in an interior of the forward end of the extension rod with a distal end of the pin positioned in the interior of the forward end of the extension rod where, with the rearward end of the rack rod received in the interior of the forward end of the extension rod, the distal end of the pin extends into the hole in the rack rod and secures the extension rod to the rack rod with the extension rod extending in the rearward direction from the rack rod without the use of tools when the rack rod is received in the forward end of the extension rod.

2. The support rack of claim 1, further comprising:
the rack rod having object attachment devices on the rack rod; and
the extension rod having object attachment devices on the extension rod.

3. The support rack of claim 1, further comprising:
the rack rod is attached to the support rack for pivoting movement of the rack rod relative to the support rack;
a detent on the rack rod, the detent being configured for engaging with a stop surface of a plurality of stop surfaces on the support rack and stop movement of the rack rod relative to the support rack in response to the detent engaging with the stop surfaces;
an actuator on the rack rod, the actuator is operatively connected to the detent and is configured for disengaging the detent from engagement with the stop surface in response to movement of the actuator on the rack rod;
an actuator extension on the extension rod, the actuator extension is positioned on the extension rod to engage against the actuator on the rack rod when the extension rod is secured to the rack rod, the actuator extension is operable to move the actuator on the rack rod to disengage the detent from engagement with the stop surface in response to movement of the actuator extension on the extension rod.

4. The support rack of claim 1, further comprising:
a bolt on the forward end of the extension rod, the bolt being movable toward and into engagement with the rack rod when the rack rod is received in the forward end of the extension rod, the bolt engagement with the rack rod further securing the extension rod to the rack rod.

5. The support rack of claim 4, further comprising:
the bolt having screw threading on the bolt and the bolt being manually rotatable on the forward end of the extension rod.

6. The support rack of claim 1, further comprising:
a sliding surface in the forward end of the extension rod, the sliding surface being configured to engage in sliding engagement with the rack rod and guide the forward end of the extension rod over the rack rod until the pin on the forward end of the extension rod is aligned with the hole in the rack rod.

7. The support rack of claim 1, further comprising:
an abutment on the rack rod, the abutment being configured to engage against the forward end of the extension rod and position the pin on the forward end of the extension rod in alignment with the hole in the rack rod and guide the pin on the forward end of the extension rod into the hole in the rack rod in securing the extension rod to the rack rod.

8. The support rack of claim 1, further comprising:
the rack rod being tubular and having a rectangular cross section configuration; and
the extension rod being tubular and having a rectangular cross section configuration configured for receiving the rack rod in the forward end of the extension rod and preventing relative rotation between the rack rod and the extension rod.

9. The support rack of claim 1, further comprising:
the rack rod and the extension rod are axially aligned when the rack rod and the extension rod are secured together.

10. An extendable object support rack for a vehicle comprising:
a rack rod having a forward end of the rack rod that is configured for attachment to a vehicle and a rearward end of the rack rod that is opposite the forward end of the rack rod, the rack rod having a length from the rearward end of the rack rod to the forward end of the rack rod that defines a forward direction relative to the rack rod and the length of the rack rod from the forward end of the rack rod to the rearward end of the rack rod defines a rearward direction relative to the rack rod;
a hole in the rearward end of the rack rod;
an extension rod having a forward end of the extension rod and a rearward end of the extension rod that is opposite the forward end of the extension rod;
an opening in the forward end of the extension rod, the opening is configured for receiving the rearward end of the rack rod in the opening in the forward end of the extension rod;
a pin in the opening in the forward end of the extension rod, the pin is positioned in the opening and in an interior of the forward end of the extension rod with a distal end of the pin positioned in the interior of the forward end of the extension rod where, with the rearward end of the rack rod received in the opening and in the interior of the forward end of the extension rod, the distal end of the pin extends into the hole in the rearward end of the rack rod and secures the extension rod to the rack rod with the extension rod extending in the rearward direction from the rack rod without the use of tools when the rearward end of the rack rod is received in the opening in the forward end of the extension rod.

11. The support rack of claim 10, further comprising:
the rack rod having object attachment devices on the rack rod; and
the extension rod having object attachment devices on the extension rod.

12. The support rack of claim 10, further comprising:
an adjustment structure on the support rack, the adjustment structure having a plurality of stop surfaces on the adjustment structure;
the forward end of the rack rod is attached to the adjustment structure for pivoting movements of the rack rod between a plurality of adjustment positions of the rack rod relative to the adjustment structure and relative to the support rack;
a detent on the forward end of the rack rod, the detent is configured for engaging with a stop surface of the plurality of stop surfaces on the adjustment structure and stop movement of the rack rod relative to the adjustment structure and relative to the support rack at an adjustment position of the plurality of adjustment positions of the rack rod in response to the detent engaging with the stop surface on the adjustment structure;
an actuator on the rack rod, the actuator is operatively connected to the detent and is configured for disengaging the detent from engagement with the stop surface on the adjustment structure in response to movement of the actuator;
an actuator extension on the extension rod, the actuator extension is positioned on the extension rod to engage against the actuator on the rack rod when the extension rod is secured to the rack rod, the actuator extension is operable to move the actuator on the rack rod to disengage the detent from engagement with the stop surface on the adjustment structure in response to movement of the actuator extension on the extension rod.

13. The support rack of claim 10, further comprising:
a bolt on the forward end of the extension rod, the bolt extending from an exterior of the extension rod to an interior of the extension rod in the opening in the forward end of the extension rod, the bolt being movable into the interior of the extension rod and into engagement with the rearward end of the rack rod when the rearward end of the rack rod is received in the opening in the forward end of the extension rod to further secure the extension rod to the rack rod.

14. The support rack of claim 13, further comprising:
the bolt having external screw threading on the bolt, the external screw threading on the bolt is screw threaded through an internally threaded hole in the forward end of the extension rod.

15. The support rack of claim 10, further comprising:
a ramp surface in the interior of the extension rod adjacent the opening in the forward end of the extension rod, the ramp surface being configured to engage in sliding engagement with the rearward end of the rack rod and guide the rearward end of the rack ride toward the pin in the opening of the forward end of the extension rod until the pin in the opening of the forward end of the extension rod is aligned with the hole in the rearward end of the rack rod.

16. The support rack of claim 10, further comprising:
an abutment extending outward from an exterior surface of the rack rod adjacent the rearward end of the rack rod, the abutment being positioned on the exterior surface of the rack rod to engage against the forward end of the extension rod and position the pin on the forward end of the extension rod in alignment with the hole in the rearward end of the rack rod and guide the pin on the forward end of the extension rod into the hole in the rearward end of the rack rod in securing the extension rod to the rack rod.

17. The support rack of claim 10, further comprising:
the rack rod being tubular and having a rectangular cross section configuration; and
the extension rod being tubular and having a rectangular cross section configuration, the rectangular cross section configuration of the extension rod at the forward end of the extension rod being configured for receiving the rectangular cross section configuration of the rearward end of the rack rod in the opening in the forward end of the extension rod and preventing relative rotation between the rack rod and the extension rod.

18. The support rack of claim 10, further comprising:
the rack rod and the extension rod are axially aligned when the rearward end of the rack rod is secured to the forward end of the extension rod.

19. An extendable object support rack for a vehicle comprising:
a rack rod having a forward end of the rack rod that is configured for attachment to a vehicle and a rearward end of the rack rod that is opposite the forward end of the rack rod, the rack ride having a length from the rearward end of the rack rod to the forward end of the rack rod that defines a forward direction relative to the rack rod and the length of the rack rod from the forward end of the rack rod to the rearward end of the rack rod defines a rearward direction relative to the rack rod;
a hole in the rearward end of the rack rod;
an extension rod that is separate from the rack rod, the extension rod having a forward end that is configured for attaching to the rearward end of the rack rod and the extension rod having a rearward end that is opposite the forward end of the extension rod;
a pin on the forward end of the extension rod, the pin is positioned on the forward end of the extension rod with a distal end of the pin exposed and positioned on the forward end of the extension rod where, with the rearward end of the rack rod attached to the forward end of the extension rod, the distal end of the pin extends into the hole in the rearward end of the rack rod and is positioned inside the rack rod and secures the extension rod to the rack rod with the extension rod extending in the rearward direction from the rack rod without the use of tools.

20. The support rack of claim 19, further comprising:
a bolt on the forward end of the extension rod, the bolt extending from an exterior of the extension rod to an interior of the extension rod in the forward end of the extension rod, the bolt being movable into the interior of the extension rod and into engagement with the rearward end of the rack rod when the rearward end of the rack rod is attached to the forward end of the extension rod to further secure the extension rod to the rack rod.

\* \* \* \* \*